No. 707,485. Patented Aug. 19, 1902.
W. WISHART & B. SEIDEL.
SAFETY VALVE.
(Application filed Oct. 25, 1901.)
(No Model.)

Witnesses:
Inventors:
William Wishart
Bruno Seidel

UNITED STATES PATENT OFFICE.

WILLIAM WISHART AND BRUNO SEIDEL, OF CHICAGO, ILLINOIS, ASSIGNORS TO THE ADAMS & WESTLAKE COMPANY, A CORPORATION OF ILLINOIS.

SAFETY-VALVE.

SPECIFICATION forming part of Letters Patent No. 707,485, dated August 19, 1902.

Application filed October 25, 1901. Serial No. 79,968. (No model.)

*To all whom it may concern:*

Be it known that we, WILLIAM WISHART and BRUNO SEIDEL, citizens of the United States, and residents of Chicago, county of Cook, and State of Illinois, have invented certain new and useful Improvements in Safety-Valves, of which the following is a specification, and which are illustrated in the accompanying drawings, forming a part thereof.

This invention relates to improvements in valves, and has particular reference to automatic safety or vent valves employed with gas-generators, steam appliances, and other machines or apparatus utilizing or containing gas, steam, and other fluids under pressure.

In the use of valves of the character referred to and which are opened under excessive pressure against the resistance of a spring, weight, or other device for holding the valve normally closed danger is encountered by reason of the tendency of the valve when not moved from its seat for a long time to become set by corrosion or from other cause, and this sometimes happens, rendering an explosion possible when the vent-valve fails to operate under abnormal pressure.

The object of this invention is to avoid the danger referred to and to provide means whereby at each operation of a part or adjunct of the apparatus or mechanism with which the venting-valve is employed, such as a feed-valve or other part frequently manipulated, the valve is moved from its seat, thereby preventing its becoming set from disuse.

The invention consists in the combination and arrangement of parts hereinafter described, and which is illustrated in the accompanying drawings, in which—

Figure 1:
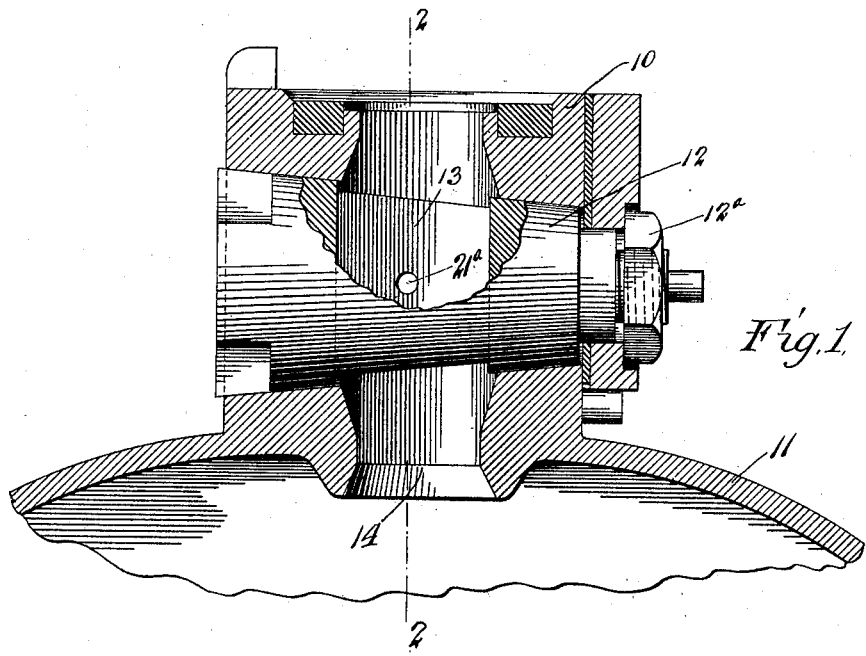
Figures 2, 3:
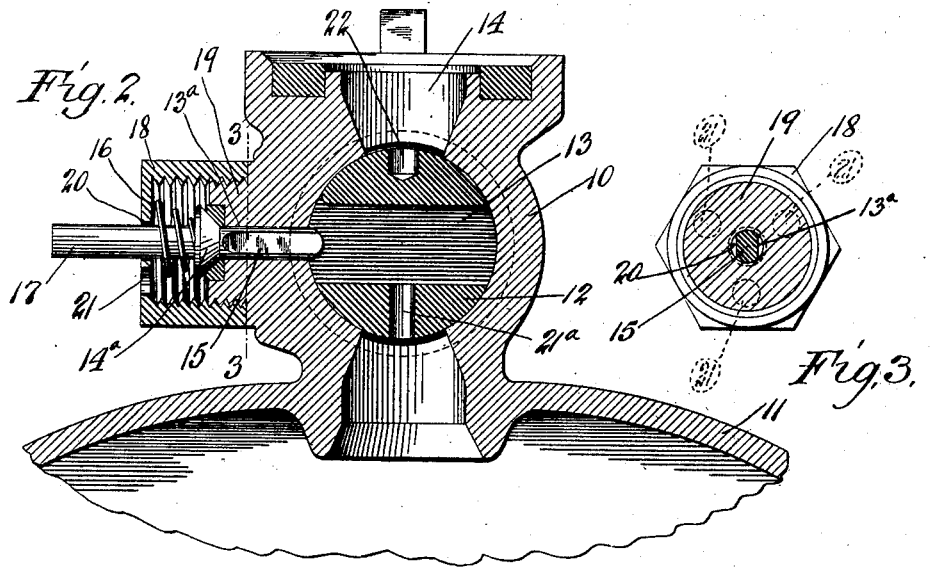

Figure 1 is a vertical section of the nipple of an acetylene-gas-generating tank, showing the valve partially in section for closing the passage therethrough. Fig. 2 is a section on the line 2 2 of Fig. 1, and Fig. 3 is a section on the line 3 3 of Fig. 2.

For convenience in illustrating and describing the invention we have shown the same applied to an acetylene-generating tank, a use to which it is especially adapted, although not restricted thereto.

Located in the nipple 10, extending from the dome or top 11 of a generating-tank and to which the piping of the system is designed to be connected, is an oscillating valve 12, held to its seat by a nut $12^a$ and having a passage 13 therethrough, which when the valve 12 is open is alined with the passage 14 in the nipple. The nipple 10 is also provided with a port $13^a$, communicating with the passage 14, and closing this port is a valve $14^a$, having a stem 15 extending through the port and projecting into the passage in the nipple. The stem 15, which has a tapered end, does not entirely fill the port $13^a$, but is of such shape that passages are formed between it and the wall of the port in order to permit of the flow of gas past the same when the valve is moved from its seat in case of excess generation of gas in the tank after the valve 12 is closed.

The valve $14^a$ is normally closed by a spring 16, which encircles a stem 17, extending outwardly from the valve $14^a$, and reacts between the said valve and a cap 18, screwed on the threaded boss 19, surrounding the port $13^a$. The cap 18 has an aperture 20, through which the stem 17 reciprocates, and openings $21^a$, leading to the atmosphere from the port $13^a$.

The valve 12 is provided with a duct 21, passing through one of the side walls thereof and entering the passage 13, and when the valve is closed—that is to say, when in the position illustrated in Fig. 2—this duct $21^a$ coincides with the passage in the nipple leading from the generating-tank, so that communication with the venting-port is established through the said duct. The outer face of the other side wall of the passage in the valve 12 has a recess 22, into which the end of the stem 15 seats itself when the valve 12 is open.

From the foregoing it will be seen that whenever the valve 12 is turned to open or close the passage in the nipple it will come in contact with the tapered end of the stem 15, projecting into its path, and tripping the stem move the vent-valve from its seat, the end of the stem entering the recess 22 or the passage 13 in the valve 12, depending upon the direction of movement of the valve, as soon as the valve has been turned to the limit of its movement.

We have shown the vent-valve located in the nipple of an acetylene-generating tank;

but it will be understood that it may be placed in any other convenient part of the system, and while a rotary oscillating valve for closing the passage in the nipple or pipe and a reciprocating vent-valve are shown it is obvious that other forms of valves may be substituted therefor and the same results secured.

We claim as our invention—

1. In an apparatus for generating or containing a fluid under pressure, in combination, a normally closed relief-valve, a movable element independent of the valve and which is an essential part of the generating or other apparatus, and an operative connection between the movable element and the valve whereby the said valve is tripped at each operation of the movable element.

2. In an apparatus for generating or containing a fluid under pressure, in combination, a spring-closed relief-valve, a movable element of the apparatus and which is independent of the valve, and an adjunct of the valve in the path of and which is tripped by the movable element during its ordinary operation to move the valve from its seat.

3. The combination of a pipe or nipple, a port in the wall thereof, a valve normally closing the port, a valve in the pipe or nipple, and means tripped by the latter valve for moving the former from its seat.

4. The combination of a pipe or nipple, a port in the wall thereof, a reciprocating valve normally closing the port, an oscillating valve in the pipe or nipple, and means tripped by the oscillating valve for moving the reciprocating valve from its seat.

5. The combination of a pipe or nipple, a port in the wall thereof, a spring-pressed valve normally closing the port, an oscillating valve in the pipe or nipple, a passage in the oscillating valve leading to the port, and a stem projecting from the port-valve and which is tripped by the oscillating valve to move the port-valve from its seat.

6. The combination of a pipe or nipple, a port in the wall thereof, a spring holding the valve normally closed, a stem projecting from the valve and into the passage of the pipe, an oscillating valve in the pipe and which engages the stem to move the port-valve from its seat, a passage through the oscillating valve communicating with the port in the wall of the pipe, and a recess in the oscillating valve to receive the end of the valve-stem when the oscillating valve is open.

7. In a generating-tank, the combination with a spring-closed blow-off valve, of a part movable in bringing the generator into service, and connection between such valve and movable part for unseating the valve as such part is moved.

8. In a generating-tank, in combination, a valve controlling the throat of the tank, a blow-off port, and a spring-closed valve therefor, the controlling-valve being provided with a tripping adjunct engaging the blow-off valve.

9. In an apparatus for generating or containing a fluid under pressure, in combination, a spring-closed relief-valve, a movable element of the apparatus independent of the valve, and a valve-unseating trip in the path of the movable element.

WILLIAM WISHART.
BRUNO SEIDEL.

Witnesses:
JOHN A. MOSHER,
WM. S. HAMM.